(12) United States Patent
Frank et al.

(10) Patent No.: US 10,830,360 B2
(45) Date of Patent: Nov. 10, 2020

(54) SEAL OF A VACUUM VALVE AND PRODUCTION METHOD THEREFOR

(71) Applicant: VAT Holding AG, Haag (CH)

(72) Inventors: Brian Frank, St. Gallen (CH); Marco Sandeck, Buchs SG (CH); Michael Moder, Feldkirch (AT); Jürgen Bestebner, Koblach (AT)

(73) Assignee: VAT HOLDING AG, Haag (CH)

( * ) Notice: Subject to any disclaimer, the term of this patent is extended or adjusted under 35 U.S.C. 154(b) by 3 days.

(21) Appl. No.: 15/872,279

(22) Filed: Jan. 16, 2018

(65) Prior Publication Data
US 2018/0202558 A1  Jul. 19, 2018

(30) Foreign Application Priority Data

Jan. 16, 2017 (EP) ..................... 17151657

(51) Int. Cl.
| | |
|---|---|
| *F16K 3/02* | (2006.01) |
| *F16K 51/02* | (2006.01) |
| *F16K 25/00* | (2006.01) |
| *F16K 3/18* | (2006.01) |
| *F16K 3/30* | (2006.01) |

(Continued)

(52) U.S. Cl.
CPC .......... *F16K 3/0227* (2013.01); *B23P 15/001* (2013.01); *F16J 15/106* (2013.01); *F16J 15/121* (2013.01); *F16J 15/128* (2013.01); *F16K 3/0263* (2013.01); *F16K 3/18* (2013.01); *F16K 3/30* (2013.01); *F16K 25/005* (2013.01); *F16K 51/02* (2013.01)

(58) Field of Classification Search
CPC .......... F16K 51/02; F16K 3/18; F16K 3/0227; F16K 3/0263; F16K 3/30; F16K 25/005; B23P 15/001
See application file for complete search history.

(56) References Cited

U.S. PATENT DOCUMENTS

| | | |
|---|---|---|
| 2,985,497 A | 5/1961 | Sauer |
| 4,809,950 A | 3/1989 | Geiser |

(Continued)

FOREIGN PATENT DOCUMENTS

| | | |
|---|---|---|
| CN | 201858386 U | 6/2011 |
| CN | 102378873 A | 3/2012 |

(Continued)

*Primary Examiner* — David Colon-Morales
(74) *Attorney, Agent, or Firm* — Muncy, Geissler, Olds & Lowe, P.C.

(57) ABSTRACT

A vacuum valve including a valve seat having a valve opening defining an opening axis and a first seal surface circumferential around the valve opening and having a closure element having a second seal surface corresponding to the first seal surface. The first seal surface and/or the second seal surface has an at least two-component material composite having a metallic carrier component and a polymer-based seal material. The metallic carrier component defines an inner and outer carrier region and has a plurality of defined depressions extending in the inner carrier region by the seal surface. The seal material is applied to the carrier component such that a defined profile of the seal material is provided on the outer carrier region and a part of the seal material extends at least into a part of the depressions of the carrier component and fills them at least halfway.

20 Claims, 3 Drawing Sheets

(51) Int. Cl.
*B23P 15/00* (2006.01)
*F16J 15/10* (2006.01)
*F16J 15/12* (2006.01)

(56) References Cited

U.S. PATENT DOCUMENTS

| | | | |
|---|---|---|---|
| 4,881,717 A | 11/1989 | Geiser | |
| 6,056,266 A | 5/2000 | Blecha | |
| 6,089,537 A | 7/2000 | Olmsted | |
| 6,089,543 A * | 7/2000 | Freerks | H01L 21/67126 251/357 |
| 6,416,037 B1 | 7/2002 | Geiser | |
| 6,629,682 B2 | 10/2003 | Duelli | |
| 6,685,163 B2 * | 2/2004 | Blecha | F16K 3/00 251/328 |
| 6,764,265 B2 * | 7/2004 | Kunze | F16K 51/02 251/193 |
| 8,074,967 B2 * | 12/2011 | Tsuji | F16K 51/02 251/328 |
| 8,181,972 B2 * | 5/2012 | Tsuji | F16K 51/02 277/641 |
| 8,888,106 B2 * | 11/2014 | Hamade | F16J 15/104 277/626 |
| 8,991,785 B2 * | 3/2015 | Sico | F16K 3/06 251/284 |
| 9,151,408 B2 * | 10/2015 | Larson | B24B 15/00 |
| 9,528,614 B2 * | 12/2016 | Geiser | F16K 3/30 |
| 2006/0273277 A1 | 12/2006 | Heller et al. | |
| 2006/0287438 A1 * | 12/2006 | Mansfield | C08F 214/18 525/326.2 |
| 2008/0274336 A1 | 11/2008 | Merrill et al. | |
| 2008/0315141 A1 * | 12/2008 | Thrash | F16K 51/02 251/170 |
| 2009/0026717 A1 | 1/2009 | Tsuji | |
| 2009/0045371 A1 | 2/2009 | Kamibayashiyama | |
| 2012/0055400 A1 | 3/2012 | Hiroki et al. | |
| 2012/0267556 A1 * | 10/2012 | Shimoda | F16K 3/18 251/301 |
| 2014/0175310 A1 | 6/2014 | Coppola et al. | |
| 2015/0176713 A1 * | 6/2015 | Khan | F16K 51/02 251/326 |
| 2016/0040789 A1 * | 2/2016 | Bestebner | B29C 43/18 251/327 |
| 2016/0208931 A1 * | 7/2016 | Yikun | F16K 1/46 |

FOREIGN PATENT DOCUMENTS

| | | |
|---|---|---|
| EP | 2420709 A1 | 2/2012 |
| EP | 2985497 A1 | 2/2016 |
| JP | 2003056724 A | 2/2003 |
| JP | 2007155016 A | 6/2007 |
| JP | 6241344 B2 | 12/2017 |

* cited by examiner

SEAL OF A VACUUM VALVE AND PRODUCTION METHOD THEREFOR

CROSS REFERENCE TO RELATED APPLICATIONS

This application claims priority to European Patent Application No. 17151657.8, which was filed in the European Patent Office on Jan. 16, 2017, and which is herein incorporated by reference in its entirety.

The invention relates to a vacuum valve and a closure element for a vacuum valve according to the preambles of Claims 1 and 11 and also a method for producing a seal surface of such a vacuum valve according to Claim 12.

In general, vacuum valves for the essentially gas-tight closing or regulating of a flow path, which leads through an opening formed in a valve housing, are known in different embodiments from the prior art. Vacuum spool valves are used in particular in the field of IC and semiconductor manufacturing, which has to take place as much as possible in a protected atmosphere without the presence of contaminating particles. For example, in a manufacturing facility for semiconductor wafers or liquid crystal substrates, the highly-sensitive semiconductor or liquid crystal elements pass through multiple process chambers sequentially, in which the semiconductor elements located inside the process chamber are each processed by means of a processing device. Both during the processing process inside the process chamber and also during the transport from process chamber to process chamber, the highly sensitive semiconductor elements always have to be located in protected atmosphere—in particular in vacuum. The process chambers are connected to one another via connection paths, for example, wherein the process chambers can be opened by means of vacuum spool valves to transfer the parts from one process chamber to the next and, subsequently to carrying out the respective manufacturing step, can be closed gas-tight. Such valves are also known as vacuum transfer valves because of the described area of application and are also known as rectangular slides because of the rectangular opening cross section thereof.

Since transfer valves are used, inter alia, during the production of highly-sensitive semiconductor elements, the particle generation, which is caused in particular by the actuation of the valve, and the number of the free particles in the valve space has to be kept as low as possible. The particle generation is primarily a consequence of friction, for example, due to metal-metal contact and due to abrasion.

The sealing can take place, for example, either via a seal arranged on the closure side of the closure plate, which is pressed onto the circumferential valve seat of the opening, or via a seal ring on the valve seat, against which the closure side of the closure plate is pressed. Different seal devices are known from the prior art, for example, from U.S. Pat. No. 6,629,682 B2 (Duelli). A suitable material for seal rings is, for example, the elastic seal material known under the tradename Viton®.

The requirements on the seals used in vacuum valves are very high. On the one hand, the leak tightness of the valve has to be ensured in the closed state. This is a significant demand above all because of the high differential pressures in the vacuum field and the large forces thus occurring, which act on the valve closure. Since the seals used are subjected to an above average level of wear in the event of excessively high compressions or are destroyed, the construction of the valve has to be such that the differential pressure forces cannot act or can only act to a limited extent on the seals. The compression of the seal is to take place as uniformly as possible along its course, which requires a uniform contact pressure force of the valve plate on the valve seat in the entire contact region. Above all, transverse loads and longitudinal loads on the seal are to be kept as small as possible. In the event of transverse loads transverse to the longitudinal direction of the seal, in O-ring seals the hazard exists that they will be torn out of the mount thereof, in particular the groove, in which they are fixed. Seals which are vulcanized on also can only be subjected to very limited transverse forces. Both in the open and also in the closed state of the valve, the seals are sometimes subjected to aggressive media and therefore either have to have a composition such that they can withstand the influences, and/or are moved out of the flow path of the medium, also to avoid abrasion. An excessively high level of wear for the seal represents an uncertainty factor for the process reliability and requires a regular replacement of the seal, which in turn results in increased standstill times in the process.

Different embodiments of vacuum valves, in particular the seal and drive technologies thereof, are known from the prior art, which have, inter alia, the goal of lengthening the service life of the valves used and improved process reliability.

Depending on the respective drive technologies, a differentiation is made in particular between spool valves, also called valve slides or rectangular slides, and pendulum valves, wherein the closing and opening usually takes place in two steps in the prior art. In a first step, a valve closure member, in particular a closure plate or a closure element, in the case of a spool valve, as is known, for example, from U.S. Pat. No. 6,416,037 (Geiser) or U.S. Pat. No. 6,056,266 (Blecha), in particular of the L type, is linearly displaced over an opening essentially parallel to the valve seat or, in the case of a pendulum valve, as known, for example, from U.S. Pat. No. 6,089,537 (Olmsted) pivoted about a pivot axis over the opening, without a contact taking place in this case between the closure plate and the valve seat of the valve housing. In a second step, the closure plate is pressed with its closure side onto the valve seat of the valve housing, so that the opening is closed gas-tight. The sealing can take place, for example, either via a seal arranged on the closure side of the closure plate, which is pressed onto the circumferential valve seat of the opening, or via a seal ring on the valve seat, against which the closure side of the closure plate is pressed. The seal, in particular the seal ring, can be held in a groove and/or vulcanized on.

The two-stage movement described, in which the closure member is firstly pushed transversely over the opening, without a contact of the seal with the valve seat taking place, and the closure member is subsequently pressed substantially perpendicularly onto the valve seat has, in addition to the possibility of precise regulation of the flow rate, above all the advantage that the seal is compressed nearly exclusively perpendicularly, without a transverse or longitudinal load of the seal occurring. The drive has a comparatively complex construction, which is formed in particular either by a single drive, which enables an L-shaped movement of the closure member, or by a plurality of drives, for example, two linear drives or one linear drive and one spreading drive. Spreading drives, which are usually arranged directly behind the closure plate and displaces it in relation to the shaft, on which it is located, in the vertical direction onto the valve seat, have a plurality of mechanical parts, which execute relative movements in relation to one another, in the valve interior.

Wedge valves, which are only displaced linearly, enable a significantly higher displacement speed, but because of the transverse stress of the seal, they are sometimes hardly suitable for the vacuum field, and if they are, only for a few displacement cycles.

This problem is solved by means of spool valves, in which the closing and sealing procedure does take place via a single linear movement, but the seal geometry is such that a transverse stress of the seal is entirely avoided. Such a valve is known, for example, under the product name "MONO-VAT series 02 and 03" and as a transfer valve designed as a rectangular insert valve from VAT Vakuumventile AG in Haag, Switzerland. The construction and the functionality of such a valve are described, for example, in U.S. Pat. No. 4,809,950 (Geiser) and U.S. Pat. No. 4,881,717 (Geiser).

The valve described therein has a seal surface in its housing, which, viewed in the direction of the axis of the valve passage opening, has successively located sections, which merge into planar seal surface sections, extending laterally outward, via continuously extending curves, wherein the imaginary generatrices of this one-piece seal surface, which has multiple sections, however, are parallel to the axis of the valve passage opening. The seal surface is processed. The closure member has a contact surface corresponding thereto for the circumferentially-closed seal. Described in more detail, the so-called valve slide has a slide housing and a slide passage opening, which is closable using a closure member displaceable in its plane. In the region of the slide passage opening, a seal surface is provided, against which a circumferentially-closed seal arranged thereon presses in the closed position of the closure member, wherein the imaginary, linear generatrices of the seal surface are parallel to the axis of the slide passage opening. The circumferentially-closed, one-piece seal has sections of different lengths and/or shapes, which are in different planes, wherein two main sections of the circumferentially-closed seal are in planes which are perpendicular to the axis of the slide passage opening and are distanced from one another. The two main sections of the seal are connected by lateral sections. The closure member has a surface which extends corresponding to the course of the seal surface of the housing and bears the circumferentially-closed seal. The lateral sections of the circumferentially-closed seal extend in a U shape. Each of the legs of these U-shaped lateral sections are in a plane. The sections of the seal surface located in succession viewed in the axial direction of the slide passage opening merge into planar seal surface sections extending laterally outward for the contact of the main sections of the seal in the region in which they have a common, linear, axially-parallel generatrix. These planar seal surface sections are in planes located parallel in relation to one another and to the axis of the slide passage opening.

A suitable drive for such a transfer valve closable by means of a linear movement is described in JP 6241344 (Buriida Fuuberuto). The drive described therein has eccentrically mounted levers for the linear displacement of the pushrods, on which the closure member is installed.

The embodiments of seals provided or applied to the closure element are essentially independent of the above-mentioned drive technologies for valve closures. As mentioned above, such a seal is typically implemented as an O-ring in a groove or—for improved durability—vulcanized by means of a special tool onto the closure element.

For the vulcanization of the seal, overflow gaps are provided, so that an excess of seal material, for example, elastomer, can be discharged and the seal can be created in accordance with the shape (profile) specified by the mold. However, the material exiting through the overload gaps remains on the plate blank, which is manufactured from aluminum or stainless steel, for example, and has to be mechanically removed following the vulcanization. This removal typically is presently carried out on means of trimming in the region of the transition zone metal/seal material and results in a removal of both seal material and also metal.

However, a greater disadvantage in this process is the occurrence of particles and the burr formation during the material removal by trimming. Since particularly this particle formation and such particles remaining on the valve closure element is extremely critical for the processing process is to be executed in the vacuum region, a reduction or at best complete avoidance of such particles is to be sought.

So-called primers (adhesion promoters) are typically used for the vulcanization process in order to ensure an adhesion of the seal material on the metal surface. Such a use has the disadvantage that the adhesion promoter also outgasses after the vulcanization process, for example, in the event of partial vacuums, and can also enter a process volume in an above-mentioned application and can therefore disadvantageously influence a processing process.

It is therefore the object of the invention to provide a seal component for a vacuum valve, i.e., for a closure plate or closure element or a valve seat, having a vulcanized-on seal, wherein improved process reliability is achieved.

In particular, it is an object to provide a corresponding seal component, wherein a production-related burr formation or the occurrence of residue particles is minimized or entirely avoided at least in the part facing toward the process volume to be terminated.

A further object is to produce the seal component so that a contamination of a process volume, which is caused by the formation of the seal component, is less probable or is prevented.

These objects are achieved by the implementation of the characterizing features of independent claims. Features which refine the invention in an alternative or advantageous manner can be inferred from the dependent patent claims.

The invention relates to a vacuum valve, in particular a vacuum regulating valve, for example, a pendulum valve or vacuum transfer valve, for regulating a volume or mass flow and/or for the gas-tight interruption of a flow path. The vacuum valve has a valve seat having a valve opening defining an opening axis and a first seal surface circumferential around the valve opening, and has a closure element (valve plate) having a second seal surface corresponding to the first seal surface, in particular with respect to course and dimensions of the seal surface.

The first seal surface and/or the second seal surface has an at least two-component material composite and the material composite in turn has a metallic carrier component and a polymer-based seal material. The seal material is applied, in particular vulcanized on, with defined profile, in particular with defined height in the direction of the surface normals of the carrier component, to the carrier component along a seal surface course.

According to the invention, the metallic carrier component defines an inner carrier region and an outer carrier region. In other words, the inner and outer carrier regions are separated by a plane defined by the boundary layer between carrier component and seal material.

The metallic carrier component has—in particular with respect to the boundary plane between carrier component and seal material—a plurality of defined depressions extending into the inner carrier region in the region of the respective seal surface, wherein each of the depressions respectively defines a volume and a depth. The seal material is moreover applied to the carrier component such that the defined profile of the seal material is provided on the outer carrier region and a part of the seal material extends at least into a part of the depressions of the carrier component and fills them at least halfway with respect to volume and/or depth, in particular fills or occupies at least 50% of the volume and/or the depth.

The filling of the depression volume relates to the volume defined by the respective depression or a volume mean value resulting in consideration of multiple depressions, in particular all depressions.

The seal material can be adhesively applied to the carrier component, for example, by means of injection molding, screen printing, or in the scope of a vulcanizing contact pressure method. In particular, the seal material is provided in a cross-linked or vulcanized state, wherein the seal material adheres on the carrier.

The adhesion of the seal material to the carrier component can thus be provided substantially by a mechanical clinging of the seal material into the depressions. In particular, the material composite can be provided free of adhesion promoter, i.e., without a so-called primer or adhesion promoter. These two factors already each individually, but also in combination, ensure that a seal is more reliably provided for a vacuum valve. Without adhesion promoter, negatively influencing outgassing of the adhesion promoter is avoided. The outgassing can not only negatively influence the adhesion quality per se, but rather this outgassing can also cause a reaction of the adhesion promoter with a process gas in a process chamber (vacuum volume), wherein the adhesion-promoting effect of this component can be lost or at least strongly decreased. In this case, in particular detachment of the seal material from the metallic underlying surface can be the consequence. Moreover, a contamination of the process gas and therefore the entire production process can result therefrom.

By means of the clinging provided according to the invention, in contrast, a highly-stable and robust adhesion with long-term resistance of the seal material on the carrier material is provided, without an adhesion promoter being used.

In one embodiment, a drive unit coupled to the valve plate is provided, which is designed such that the valve plate is displaceable at least from an open position, in which the valve plate and the valve seat are provided without contact in relation to one another, into a closed position, in which an axially sealing contact exists between the first seal surface and the second seal surface via an interposed seal material and the valve opening is thus closed gas-tight, and back, at least essentially along a geometrical longitudinal axis in a longitudinal closing direction.

A degree of filling with respect to a filling of one of the depressions or a majority, in particular all of the depressions with the seal material can be on average at least 50%, in particular at least 75% or at least 90%.

At least 50%, in particular at least 75% or at least 90%, of the volumes defined by the depressions can be filled at least 50%, in particular at least 75% or at least 90%, with the seal material.

With respect to the design of the depressions, different embodiments are conceivable according to the invention. At least one of the depressions, in particular a majority or essentially all depressions, in the inner carrier region can be formed as a:

- cylindrical recess (for example, channel) delimited on one side having defined depth or
- cylindrical recess delimited on one side having defined depth having an enlarged end region in relation to the recess diameter, in particular having ellipsoid end volume, in particular repository volume, or
- depression having an undercut or
- conical or wedge-shaped depression having a width decreasing or increasing with increasing depth.

According to one embodiment of the invention, at least one of the depressions, in particular a plurality or essentially all depressions, has a depth in the inner carrier region from a range between 200 μm and 500 μm, in particular from a range between 300 μm and 400 μm. Said depression therefore extends in relation to the carrier surface over a length of, for example, 300 μm or 350 μm into the interior of the carrier material.

At least one of the depressions, in particular a majority or essentially all depressions, can have an internal diameter, in particular in relation to the surface thereof, from a range between 80 μm and 200 μm, in particular from a range between 100 μm and 130 μm.

In one embodiment, at least one of the depressions, in particular a majority or essentially all depressions, is formed having a ratio of internal diameter to depth in the inner carrier region of $d:t<1:2$, in particular $d:t<1:3$ or $d:t<1:4$.

The above specifications can alternatively also relate to respective mean values with respect to multiple or all produced depressions. An average depth of the depressions can thus be in a range between 200 μm and 500 μm, in particular in a range between 300 μm and 400 μm. An average internal diameter can be in a range between 80 μm and 200 μm, in particular in a range between 100 μm and 130 μm. A mean ratio of diameter to depth can be provided for the depressions of $d:t<1:2$, in particular $d:t<1:3$ or $d:t<1:4$.

According to one embodiment of the invention, a distance of respective adjacent depressions, in particular from center point to center point, is 100 μm$<a<$250 μm. The adjacent depressions are located in this case in particular in a row or along a path, which extends along the seal course.

According to the invention, at least one of the depressions, in particular a majority or the entire plurality of the depressions, can extend over a part along the seal surface. In particular, this depression can be applied concentrically in relation to the valve opening or according to the shape of the seal surface.

Respective adjacent depressions can be arranged essentially in parallel with respect to the alignments thereof or the depressions can be (intentionally) arranged chaotically with respect to the alignment thereof.

The created depressions can moreover fulfill the purpose of an overflow volume. For the production of a seal according to this invention, a larger volume is typically required for the vulcanization process than the seal produced thereby finally occupies, since the seal material experiences a spatial expansion and subsequently in turn a contraction during the vulcanization. A volume of a depression, in particular multiple or all depressions or a mean value for the volume can be defined such that the volume is greater than a volume occupied by the volume of the vulcanized seal material in the depression. In particular, this volume can be larger such that an enlargement of the spatial dimensions of the seal material occurring during vulcanization can be accommodated in the depression. In this way, for example, the provision of an additional overflow channel can be omitted.

The described two-component material composite, in particular the depressions, can be produced according to a method described hereafter.

The invention moreover relates to a closure element, in particular a valve plate, for a vacuum valve which is designed to regulate a volume or mass flow and/or for the gas-tight termination of a process volume by means of interaction with a vacuum valve opening of the vacuum valve provided for the process volume. The closure element has a second seal surface corresponding to a first seal surface of the valve opening, in particular with respect to shape and size, wherein the first seal surface is circumferential around the vacuum valve opening. The second seal surface has a two-component material composite and the material composite in turn has a metallic carrier component and a polymer-based seal material. The seal material is applied, in particular vulcanized, onto the carrier component along a seal surface course having defined profile, in particular having defined height in the direction of the surface normals of the carrier component.

According to the invention, the metallic carrier component defines an inner carrier region and an outer carrier region and the metallic carrier component has a plurality of defined depressions extending into the inner carrier region with respect to a boundary plane between carrier component and seal material in the region of the respective seal surface, wherein each of the depressions respectively defines a volume and a depth. The seal material is vulcanized onto the carrier component such that the defined profile of the seal material is essentially provided on the outer carrier region and a part of the seal material extends at least into a part of the depressions of the carrier component and fills them at least halfway with respect to volume and/or depth The invention furthermore relates to a method for producing an at least two-component material composite for at least one seal surface of a vacuum valve, having a metallic material blank which embodies at least a part of a closure element or a valve seat of the vacuum valve and forms a carrier component for the two-component material composite, wherein a surface of the material blank separates and defines an inner carrier region from an outer carrier region.

Surface processing of the material blank is carried out such that a plurality of defined depressions extending into the inner carrier region is created along the seal surface to be created. The material blank and a polymer-based seal material are introduced into a multifunction mold in an open mold state, in a compression and/or heating step, the seal material is deformed and/or liquefied, in particular compressed or pressed, by closing the multifunction mold such that a part of the seal material enters the depressions of the material blank and at least partially fills them, and in an end step, normalization, in particular cooling and/or relaxation of a state of the seal material and/or the carrier component takes place.

In particular, before the execution of the end step, a vulcanization step takes place with vulcanization of the seal material such that a first part of the seal material along a seal surface course is provided vulcanized with a defined profile on the outer carrier region, and a second part of the seal material is provided vulcanized and extending into the depressions of the material blank and filling the depressions at least halfway. In particular, the multifunction mold is temperature-controlled during the vulcanization step according to a predetermined cross-linking curve.

The creation of the depressions is especially carried out by at least one of the following means, i.e., by application of:
pulsed laser radiation,
milling,
etching,
drilling, and/or
pressing.

In particular, the creation of one of the depressions is carried out in that a focused laser beam is oriented onto a specific position on the surface of the material blank, wherein the laser radiation, while maintaining the alignment on the specific position (the relative alignment on the position is maintained) is emitted multiple times, in particular at least 10 times or at least 50 times, and in pulsed form.

The invention additionally relates to a closure element, which is obtained by executing the cited method. In particular wherein a closure element will be or is formed as described.

The devices according to the invention and the method according to the invention will be described in greater detail solely by way of example hereafter on the basis of specific exemplary embodiments schematically illustrated in the drawings, wherein further advantages of the invention will also be discussed. In the individual figures.

Figure 3A:
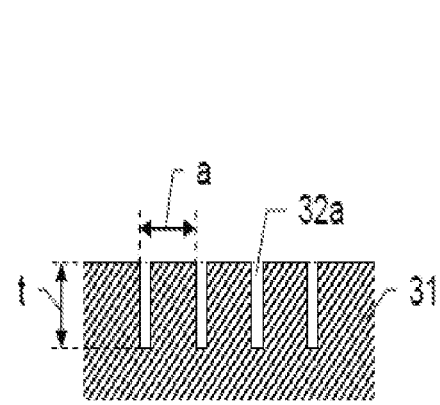
Figure 3B:
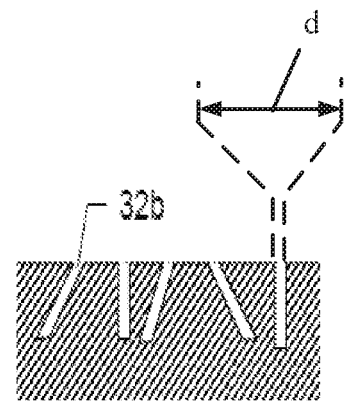
Figure 3C:
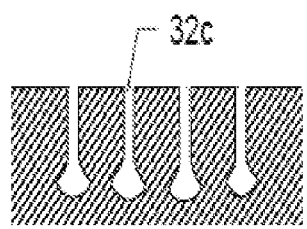
Figure 3D:
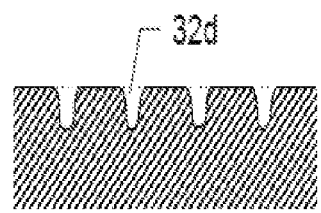
Figure 3E:
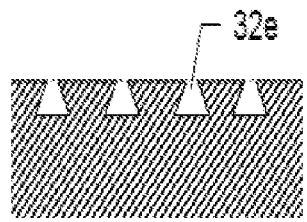
Figure 3F:
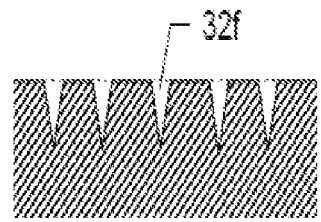
Figure 4:
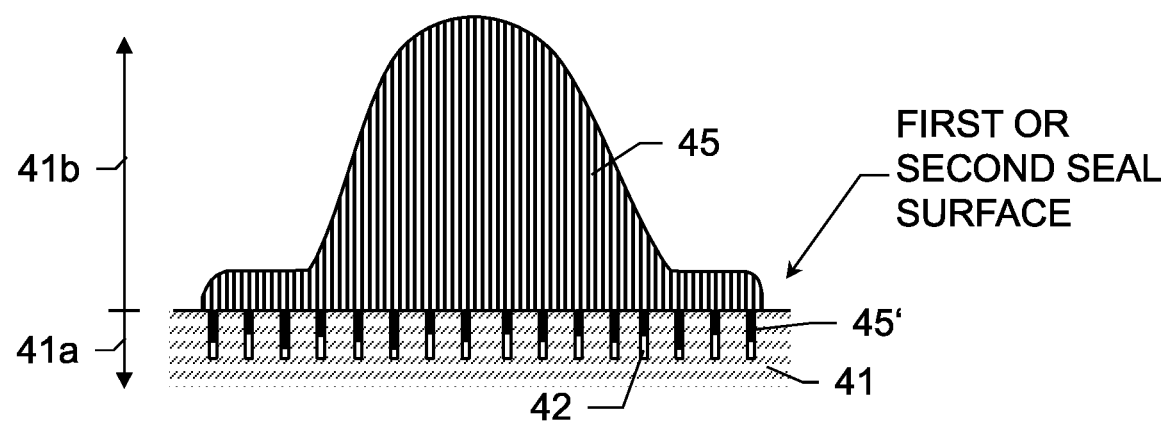

FIGS. 3a-f show different embodiments of the depressions created according to the invention in the carrier component (valve seat or valve plate); and FIG. 4 shows a cross section through an at least two-component material composite according to the invention made of a metallic carrier component and a polymer-based seal material.

Figure 1:
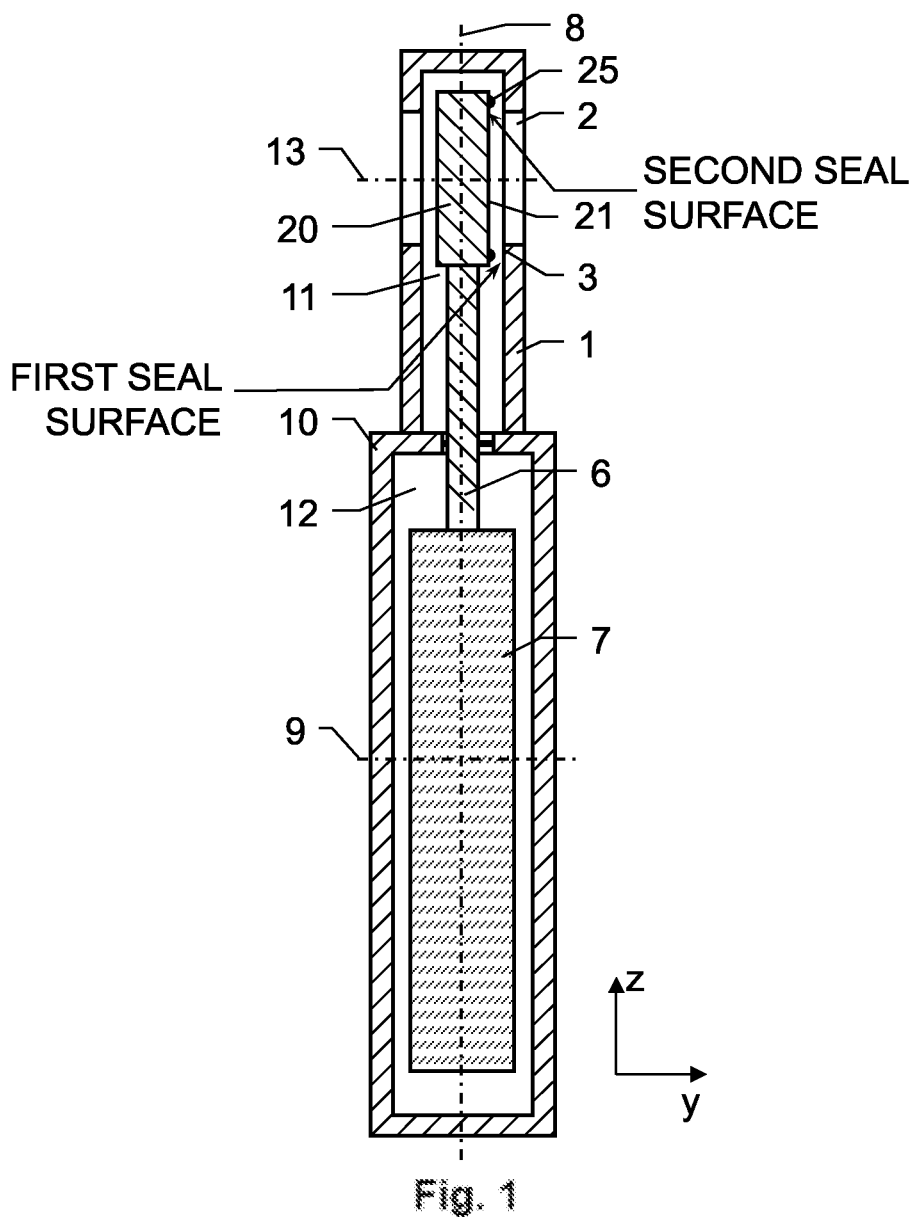
FIG. 1 shows a first embodiment of a vacuum valve according to the invention.

FIG. 1 shows a first embodiment of a vacuum slide valve according to the invention. The vacuum slide valve has a valve housing 10 having a valve wall 1, which has an opening 2 having an opening axis 13 and an oblong, essentially rectangular valve seat 3, which is circumferential around the opening 2. A closure element 20 having a closure side 21, which is provided in particular on the process side, and which has a somewhat larger cross section than the opening 2, is used for the essentially gas-tight closing of the opening 2, by pressing the closure side 21 onto the valve seat 3. The closure element 20 is supported by two valve rods 6 arranged parallel to one another. Since the valve rods are shown in a side view in FIG. 1, only one valve rod 6 is recognizable therein. According to alternative embodiments according to the invention, only a single valve rod 6 can also be provided and the closure element 20 can be supported thereby.

The valve housing 10 is divided into a vacuum region 11, in which the opening 2, the valve seat 3, and the closure plate 20 are arranged, and a drive region 12, which lies outside the vacuum region 11. The two valve rods 6 are guided through from the vacuum region 11 into the drive region 12 through two gas-tight feedthroughs, which are embodied as diaphragm seals or diaphragm bellows having seals on the end parts thereof (for example, O-rings), in the valve housing 10. The diaphragm seals or the diaphragm bellows are embodied such that the valve rods 6 are movable while maintaining the gas-tight seal in a certain movement range along a longitudinal axis 8 and a transverse axis 9. Since the drive region 12 is separated gas-tight from the vacuum region 11, an atmospheric pressure can prevail in the drive region 12. Friction particles located in the drive region 12 cannot enter the sensitive vacuum region. A drive unit 7 is arranged in the drive region 12.

The drive unit 7 is designed such that the closure plate 20 is displaceable by displacement of the two valve rods 6 along the geometrical longitudinal axis 8 in a longitudinal closing direction z from an open position, into the intermediate position shown here, and by displacement of the two valve rods 6 along the geometric transverse axis 9 extending perpendicularly to the longitudinal axis 8 in a transverse closing direction y from the intermediate position into a closed position, and back (movement of the closure plate is L-shaped, therefore the designation L type).

The closure element 20 has a circumferential, vulcanized-on seal material 25, which is delimited, for example, by means of compression toward the inner region of the closure side 21, i.e., toward the surface terminated by the seal on the closure side 21. The polymer-type seal material 25 is essentially anchored by means of mechanical clinging in provided depressions in the carrier material, whereby the adhesion of the seal material 25 is essentially provided. The adhesion of the seal material 25 can in particular also be provided in a small component on the basis of a chemical bond. The adhesion of the seal material 25 on the carrier material is then composed, for example, of a mechanical adhesion component and a chemical adhesion component, which result in total in an overall adhesion for the seal material 25. The adhesion can be attributed 90% to mechanical effects and 10% to chemical effects, for example.

A more detailed illustration and description of the embodiment according to the invention of the seal and transition region seal/metal is provided hereafter.

A further embodiment of the invention relates to a valve spool valve (not shown here), which is known, for example, under the product name "MONOVAT series 02 and 03" and as a transfer valve designed as a rectangular insert valve from VAT Vakuumventile AG in Haag, Switzerland, has a rectangular opening cross section, the width of which is substantially greater than its height. Such valve types having complex seal structures are also known, for example, from EP 2 420 709 A1.

Such valves are also provided for the gas-tight closing of a flow path, but solely by means of a linear movement of the closure element. The closure member is displaceable linearly along a geometric displacement axis, which extends transversely in relation to the opening axis, in a closure member plane from an open position, which exposes the opening, into a closed position pushed linearly over the opening in a closing direction and vice versa back in an opening direction. In a closed position, the seal material applied to the seal surface of the closure element is pressed onto the seal surface which is circumferential around the opening.

Such a vacuum valve, which is known from the prior art and is closable by means of a single linear movement, has advantages in relation to the transfer valves closable by means of two movements, which require a comparatively complexly constructed drive, or in relation to the wedge valves, in which the seals are transversely stressed. Since the closure member of the above-described vacuum valve is in one piece, it can be subjected to high acceleration forces, so that this valve can also be used for rapid and emergency closures. The closing and sealing can be performed by means of a single linear movement, so that very rapid closing and opening of the valve is possible. The circumferential seal finds unique reproducible conditions during the diverse closing procedures in all of its sections. Since the seal is essentially only stressed in the direction of the linear closing movement in the perpendicular direction to the seal and/or partially in the longitudinal direction, but not transversely in relation to its longitudinal extension during the closing and upon the occurrence of the closing pressure, so that transverse forces on the seal are avoided, this vacuum valve is suitable for highly-qualified sealing tasks in the vacuum and high vacuum range.

According to the invention, the seal material in turn adheres to the closure element (closure member) due to the provision of defined depressions in the closure element. The seal material extends at least partially into these depressions, whereby clinging of the material is provided.

It is obvious that the embodiment shown in FIG. 1 represents an exemplary embodiment of a vacuum valve. The invention accordingly also extends to alternative vacuum valves which have a seal embodied according to the invention, i.e., a two-component material composite according to the invention.

Figure 2:
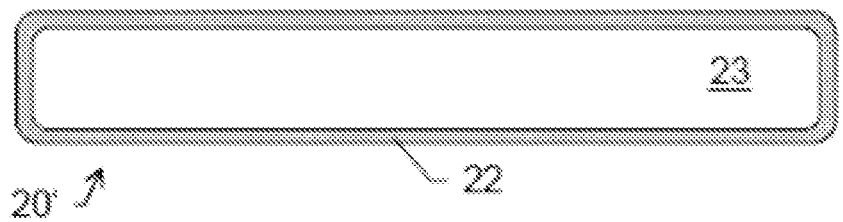
FIG. 2 shows an essentially rectangular valve plate for a vacuum valve according to the invention.

FIG. 2 shows an essentially rectangular valve plate 20' for a vacuum valve according to the invention, in particular for a vacuum valve of the L type, in a horizontal projection. The valve plate 20' is constructed as a carrier component for a seal material made of a metal or a metal alloy, for example, aluminum or stainless steel, wherein a seal surface 22 having a seal applied thereon is provided around the circumference on the edge of the valve plate 20'.

The seal material can be, for example, a polymer, in particular an elastomer, wherein the material in particular has a fluoropolymer component and/or a perfluoropolymer component.

The seal is created by means of vulcanization of a cross-linkable seal material on the seal surface 22. The surface of the carrier 20' is pretreated such that a plurality of defined depressions extend into the carrier material and each form defined recesses therein. The depressions are preferably created having a depth of at least 300 μm with respect to the carrier surface. The shape of the depression can be, for example, cylindrical, conical, or pyramidal having decreasing width with increasing depth or also wedge-shaped, wherein the depression can extend along the seal contour (along the course of the seal surface 22), and in particular can be embodied as concentrically circumferential.

The effective surface area of the valve plate 20' is accordingly enlarged by the created depressions.

The depressions are created by means of irradiation of the carrier component using pulsed laser radiation. The individual depressions are created in particular by multiple bombardments of a specific surface position using the pulsed radiation. The pulsed laser radiation used here has a comparatively high energy density per pulse, whereby liquefaction and/or vaporization of the metal occurs upon an interaction with the metallic carrier surface. By means of the multiple applications on one point, a depression can thus be created by such removal and/or "drilled" in this manner. Laser radiation in the infrared wavelength range is preferably used for this purpose.

The propagation direction of the laser radiation is selected, for example, so that adjacent depressions are aligned essentially parallel to one another, in particular orthogonally to the surface.

The depressions can also be produced by means of alternative methods. For example, respective depressions can be created by very targeted and fine milling or mechanical drilling.

The depressions are only created in the region of the seal surface, i.e., within a predetermined area. This has the advantage that this type of surface processing can be restricted to this defined region and solely this region is processed. In this way, efficient processing of only the seal surface can be performed. This is particularly advantageous under the aspect of a short processing time.

In the course of the vulcanizing of the seal material onto the seal surface 22, the raw material is deformed under pressure and/or elevated temperature such that a part of the seal material penetrates into the depressions, in particular is pressed or flows, and is vulcanized (cross-linked) in this state, i.e., brought into a desired plastic-elastic shape. The result then forms a seal surface having a carrier material, which has defined depressions (with respect to number, shape, and dimension), wherein the depressions are at least partly filled and are at least partially filled using the seal material and thus adhesion—predominantly by clinging of the polymer in the depressions—of the seal material on the carrier is provided. For example, in the scope of the vulcanization, at least 90% or up to 99% of the created depressions are filled with the seal material. The degree of filling for these depressions can then preferably be between 50% and 100%, in particular between 90% and 99%.

The volumes of the depressions are selected in particular such that the depressions not only represent the basis for the adhesion, but rather are simultaneously used in the total thereof as an overflow volume and are capable of accommodating any possible excess seal material. For example, a typically provided overflow channel can be omitted due to such a design. Burr formation as a result of excess seal material is thus avoided and postprocessing of a seal component thus produced can occur to a lesser extent or can be omitted entirely. As a consequence, a very advantageous, correspondingly lesser particle creation is to be expected.

Collecting excess seal material is also to be provided because the volume of the material temporarily increases during the vulcanization and decreases again thereafter.

The area 23, which is enclosed by the seal surface 22 and/or the vulcanized-on seal, is the region of the closure element 20' facing toward the process volume to be terminated in the provided use of the closure element 20' in a vacuum valve, wherein moreover a part of the seal also remains facing toward the process volume in a closed position of the valve.

FIGS. 3a to 3f show different embodiments of the depressions created according to the invention in the carrier component (valve seat or valve plate).

FIG. 3a shows depressions 32a arranged regularly in a seal carrier 31. The depressions 32a are cylindrical recesses, which are formed essentially homogeneously over the depth thereof, in the carrier material. The carrier material can be implemented, for example, on the basis of iron or aluminum, in particular as a respective alloy. In the scope of the vulcanizing on of a polymer-based seal material, this seal material can be deformed or (partially) liquefied such that a part thereof can enter the depressions 32a and can be cross-linked in the depressions after completed vulcanization and can be provided clinging to the carrier material.

The carrier component has the depressions 32a in particular with a distance a>150 μm between two adjacent depressions 32a, in particular with a distance 250 μm>a>150 μm. In one preferred embodiment, the distance a is essentially 200 μm.

Adjacent depressions are understood in the scope of the present invention in particular as the depressions which are arranged along a line or a path, for example, depressions arranged circumferentially at a defined distance to a valve opening or radially with respect to a valve opening or the center thereof.

The depressions 32a are between 100 μm and 500 μm deep (500 μm>t>200 μm), i.e., they extend from the surface of the carrier material at least 200 μm deep into the interior of the carrier material, in particular at least 300 μm deep. The depressions 32a are preferably up to 400 μm deep.

In addition, the depressions 32a have an internal diameter d on the carrier surface of at least 80 μm, in particular at least 100 μm. The diameter d is preferably less than 200 μm, in particular less than 130 μm.

In the embodiment shown having essentially homogeneous cylindrical recesses, the internal diameter d remains substantially constant with increasing depth.

The depressions 32a can especially be formed such that at least one of the depressions, in particular essentially all such depressions are implemented having a specific ratio of internal diameter (in particular with respect to the carrier surface) to depth. The ratio of internal diameter d to depth t can be for this purpose d:t<1:2 or d:t<1:3 or d:t<1:4, i.e., a depression is deeper by at least a factor of 2, 3, or 4 than its diameter.

It is obvious that the above values with respect to distance a, depth t, and diameter d do not have to relate solely to a single depression or all depressions 32a, but rather in the context of the invention can each also relate to a mean value for the created depressions 32a.

The depressions 32a can be introduced or have been introduced into the seal carrier 31, for example, by means of laser application. A method of laser drilling can be used for this purpose, for example, wherein a number of short laser pulses (for example, pulse duration in the nanosecond, picosecond, or femtosecond range and 10 to 50 pulses) having high repetition frequency (for example, 50 or 100 kHz) are oriented focused on the surface of the carrier and emitted using a high-performance pulsed short pulse laser. The series of pulses remains consistently oriented on the same position in this case with respect to the surface. In this way, a depression can be created in steps, i.e., step-by-step. A part of the carrier material is "removed" per incident laser pulse, i.e., displaced by liquefaction or vaporized.

The shape of the depression resulting in this case can be set and determined, for example, via the selectable laser parameters such as pulse duration, pulse peak power, repetition frequency, or beam focusing and diameter, and by effects thus achievable such as plasma formation.

The depressions 32a can alternatively be created, for example, by means of other cutting, abrading, compressive, abrasive, or etching methods. The depression can be produced, for example, by fine precision drilling, milling, or targeted compression of the carrier material. The described specifications for the embodiment according to FIG. 3a apply accordingly to the embodiments of FIGS. 3b to 3f.

The alignment of the laser beam determines in this case the extension direction of a depression in the interior of the seal carrier 31. In the example according to FIG. 3a, the alignment of the laser beam is selected parallel to a normal of the surface, i.e., orthogonally to the surface.

FIG. 3b also shows cylindrically created depressions 32b, but having different extension directions in the carrier material. A further improved adhesion of the seal material on the carrier material can be provided in such a variant. Due to the depressions 32b, which extend transversely and not orthogonally to the surface, a seal material vulcanized therein can only be detached with increased difficulty from the carrier, in particular in the event of a corresponding orthogonal stress. In particular in the case of depressions, the extensions of which are oriented in opposite directions (as shown), the detachment is made more difficult in particular.

FIG. 3c shows a further embodiment of depressions 32c according to the invention. These each have a volumeenlarging repository at the closed end thereof. In this way, an overflow volume enlarged in its entirety can be provided for accommodating excess and/or expanding seal material. Therefore, a special overflow channel can be omitted for the production of a seal surface for a vacuum valve and the quantity of the seal material can be selected accordingly matching thereto. Postprocessing of the seal surfaces can therefore also be omitted, whereby possible particle formation as a result thereof is precluded. This is advantageous in particular with respect to the very high cleanness standards in vacuum technology.

FIG. 3d shows further alternative depressions 32d in the form of grooves extending in the plane of the drawing. Such grooves 32d can be pressed or milled, for example, into the material. The grooves 32d can be formed in particular along the shape of the seal surface to be formed, for example, concentrically in relation to the valve opening and circumferentially around this valve opening.

FIG. 3e shows depressions 32e according to the invention in the form of boreholes having a respective undercut. The adhesion of the seal material on the carrier is further strengthened by the shape of the depressions 32e. Detachment of the vulcanized provided seal material from the depressions is made significantly more difficult because of the increasing internal diameter or width with increasing depth.

FIG. 3f illustrates a further variant of depressions 32f according to the invention. The depressions 32f are formed conical and/or pyramidal or wedge-shaped, wherein in the case of a wedge-shaped embodiment, these depressions are created, for example, extending into the plane of the drawing and extend concentrically to the valve opening at least in a partial region.

FIG. 4 shows a cross section through an at least two-component material composite according to the invention made of a metallic carrier component 41 and a polymer-based seal material 45. The material composite embodies the one-sided part of a vacuum seal for a vacuum valve.

The carrier component 41 defines, with respect to a plane defined by the course of the seal surface and/or by the boundary surface between carrier component 41 and seal material 45, an inner carrier region 41a and an outer carrier region 41b.

To produce a seal, the seal material 45 is compressed by means of a counter component, for example, an opposing seal surface. The seal surface in particular has a shape for this purpose which corresponds to the shape of the seal material 45 along a seal surface (on the side of the valve seat or valve plate) of the vacuum valve.

The seal material 45 is based in particular on a fluoropolymer and is to be assigned to the group of elastomers. To create the shape shown of the seal material 45 it is introduced as a raw material, i.e., non-cross-linked and non-vulcanized, together with the carrier material into a temperature-controllable mold and compressed into the desired shape by closing the mold. In conjunction with heating the mold or a corresponding mold part, initially the viscosity of the raw material is reduced and the material can firstly assume the intended shape in an improved manner, and can secondly partially enter the depressions 42 shown of the carrier component 41. The material can flow in the depressions 42 and/or can be pressed into these depressions 42 by an applied pressure depending on the production parameters.

In the further course of the temperature control, cross-linking (vulcanization) of the raw material and therefore the adhesion of the seal material 45 on the carrier element 41 is caused thereby. The parts of the seal material 45', which are then provided in vulcanized form in the depressions 42, provide clinging to the metallic carrier 41 in particular. A lower effect component with respect to the adhesion can also be based on chemical effects (for example, chemical bonds), in addition to the mechanical clinging.

As already described above, the depressions 42 each extend with a defined depth in defined directions into the carrier component 41. The depressions 42 are produced in particular by means of laser processing.

FIG. 4 additionally illustrates the presence of the seal material component 45' in the depressions. The seal material component 45', with respect to a respective depression 42, in particular occupies at least 50% of the volume defined by this depression 42. In particular, the depressions 42 are filled on average by at least 50% with the material. The specified degree of filling can relate in general to the volumes or depths of the depressions 42.

It is apparent that the illustrated figures only schematically represent possible exemplary embodiments. According to the invention, the various approaches can also be combined with one another and with methods and devices for closing process volumes under vacuum conditions of the prior art.

The invention claimed is:

1. A vacuum valve for regulating a volume or mass flow and/or for a gas-tight interruption of a flow path, comprising:
a valve seat having
a valve opening defining an opening axis and
a first seal surface circumferential around the valve opening, and
a closure element having a second seal surface corresponding to the first seal surface
wherein
the first seal surface and/or the second seal surface has an at least two-component material composite and the material composite has a metallic carrier component and a polymer-based seal material, and
the seal material having a defined profile,
wherein,
the metallic carrier component defines an inner carrier region and an outer carrier region,
the metallic carrier component has a plurality of at least three defined depressions extending into the inner carrier region in the region of the respective seal surface, wherein each of the depressions respectively defines a volume and a depth, wherein at least one of the depressions in the inner carrier region is formed as a cylindrical recess that is delimited on one side having a defined depth or as a conical or pyramidal recess having decreasing width with increasing depth, and
the seal material is applied to the carrier component such that
the defined profile of the seal material is provided on the outer carrier region and a part of the seal material extends at least into a part of the depressions of the carrier component and fills them by at least 50% with respect to volume and/or depth.

2. The vacuum valve according to claim 1, wherein,
a degree of filling with respect to a filling of one of the depressions at least 50%
and/or
at least 50% of the volumes defined by the depressions are filled at least 50% with the seal material.

3. The vacuum valve according to claim 1, wherein, at least one of the depressions in the inner carrier region is formed as a cylindrical recess that is delimited on one side having a defined depth and an end region enlarged with respect to the recess diameter or as a depression having an undercut or as a conical or wedge-shaped depression having a width decreasing or increasing with increasing depth.

4. The vacuum valve according to claim 1, wherein, at least one of the depressions,
has a depth in the inner carrier region from a range between 200 µm and 500 µm
and/or has an internal diameter from a range between 80 µm and 200 µm
and/or is formed having a ratio of internal diameter d to depth t in the inner carrier region of d:t<1:2.

5. The vacuum valve according to claim 1, wherein,
an average depth for the plurality of the depressions is in a range between 200 µm and 500 µm and/or
an average internal diameter for the plurality of the depressions is in a range between 80 µm and 200 µm and/or
a mean ratio of internal diameter d to depth t for the plurality of the depressions of d:t<1:2.

6. The vacuum valve according to claim 1, wherein,
the adhesion of the seal material on the carrier component is essentially provided by mechanical clinging of the seal material in the depressions,
and/or the material composite is provided without adhesion promoter.

7. The vacuum valve according to claim 1, wherein a distance of respective adjacent depressions is more than 100 µm and less than 250 µm.

8. The vacuum valve according to claim 1, wherein at least one of the depressions extends along the first seal surface or along the second seal surface.

9. The vacuum valve according to claim 1, wherein,
respective adjacent depressions are arranged essentially parallel with respect to the alignments thereof or the depressions are intentionally arranged chaotically with respect to the alignment thereof.

10. The vacuum valve according to claim 1, wherein, a volume of a depression is defined such that the volume is greater than a volume occupied by the volume of the seal material, which is vulcanized, in the depression.

11. The vacuum valve of claim 1, wherein the first seal surface has a similar path and dimensions as the second seal surface, the seal material has a defined height in a direction of surface normals of the carrier component and is vulcanized onto the carrier component.

12. The vacuum valve according to claim 2, wherein the degree of filling with respect to the filling of a majority of all of the depressions with the seal material is on average at least one of 50%, 75%, or 90%, and/or at least 75% or 90% of the volumes defined by the depressions are filled at least 75% or 90% with the seal material.

13. The vacuum valve according to claim 3, wherein a majority of all depressions in the inner carrier region is formed as a cylindrical recess delimited on one side having a defined depth or as a cylindrical recess delimited on one side having a defined depth and having an end region with one of an ellipsoidal end volume or a repository volume.

14. The vacuum valve according to claim 4, wherein a majority of the depressions
have a depth in the inner carrier region from a range between 300 µm and 400 µm,
and/or has an internal diameter on its surface from a range between 100 µm and 130 µm,
and/or is formed having a ratio of internal diameter d to depth tin the inner carrier region of d:t<1:3 or d:t<1:4.

15. The vacuum valve according to claim 5, wherein the average depth for the plurality of the depressions is in a range between 300 µm and 400 µm,
and/or
the average internal diameter for the plurality of the depressions is in a range between 100 µm and 130 µm,
and/or a mean ratio of internal diameter d to depth t for the plurality of the depressions of d:t<1:3 or d:t<1:4 is provided.

16. The vacuum valve according to claim 8, wherein the entire plurality of the depressions extends along the seal surface concentrically with respect to the valve opening.

17. The vacuum valve according to claim 10, wherein the volume of all depressions or a mean value for the volume is sufficiently larger that the seal material can be accommodated in the depression due to an enlargement of the spatial extension of the seal material occurring during vulcanization of the seal material.

18. A closure element for a vacuum valve and designed for regulating a volume or mass flow and/or for a gas-tight termination of a process volume by means of interaction with a vacuum valve opening of the vacuum valve provided for the process volume, having a second seal surface corresponding to a first seal surface of the valve opening wherein the first seal surface is circumferential around the vacuum valve opening,
wherein the second seal surface has an at least two-component material composite and the material composite has a metallic carrier component and a polymer-based seal material, and
the seal material having a defined profile is applied onto the carrier component along a seal surface course,
wherein, the metallic carrier component defines an inner carrier region and an outer carrier region, the metallic carrier component has a plurality of at least three defined depressions extending into the inner carrier region in the region of the respective seal surface, wherein each of the depressions respectively defines a volume and a depth and wherein at least one of the depressions in the inner carrier region is formed as a cylindrical recess that is delimited on one side having a defined depth, and
the seal material is applied to the carrier component such that the defined profile of the seal material is provided on the outer carrier region and a part of the seal material extends at least into a part of the depressions of the carrier component and fills them by at least 50% with respect to volume and/or depth.

19. A closure element according to claim 18, wherein the second seal surface has a similar shape and size as the first seal surface, and the seal material has a defined height in the direction of the surface normals of the carrier component and is vulcanized onto the carrier component along the seal surface course.

20. A closure element for a vacuum valve and designed for regulating a volume or mass flow and/or for a gas-tight termination of a process volume by means of interaction with a vacuum valve opening of the vacuum valve provided for the process volume, having a second seal surface corresponding to a first seal surface of the valve opening
wherein the first seal surface is circumferential around the vacuum valve opening, wherein the second seal surface has an at least two-component material composite and the material composite has a metallic carrier component and a polymer-based seal material, and the seal material having a defined profile is applied onto the carrier component along a seal surface course, wherein, the metallic carrier component defines an inner carrier region and an outer carrier region, the metallic carrier component has a plurality of at least three defined depressions extending into the inner carrier region in the region of the respective seal surface, wherein each of the depressions respectively defines a volume and a depth and wherein at least one of the depressions in the inner carrier region is formed as a conical or pyramidal recess having decreasing width with increasing depth, and the seal material is applied to the carrier component such that the defined profile of the seal material is provided on the outer carrier region and a part of the seal material extends at least into a part of the depressions of the carrier component and fills them by at least 50% with respect to volume and/or depth.

* * * * *